United States Patent Office 2,944,066
Patented July 5, 1960

2,944,066

PROCESS FOR THE PRODUCTION OF 3-KETOTETRAHYDROFURAN

Edwin George Edward Hawkins, Lower Kingswood, Surrey, England, assignor to The Distillers Company Limited, Edinburgh, Scotland, a company of Great Britain No Drawing. Filed Oct. 13, 1958, Ser. No. 766,689

Claims priority, application Great Britain Oct. 25, 1957

7 Claims. (Cl. 260—347.8)

The present invention relates to a process for the production of 3-ketotetrahydrofuran.

3-ketotetrahydrofuran is a known compound which is useful as a reducing agent and is an intermediate in the production of pyridoxine (vitamin $B_6$).

According to the present invention the process for the production of 3-ketotetrahydrofuran comprises heating the lower boiling isomer of 3-chloro-4-hydroxy-tetrahydrofuran in the presence of silver oxide, cuprous oxide or mercuric oxide or a mixture of silver oxide and cuprous oxide.

3-chloro-4-hydroxy-tetrahydrofuran exists in two isomeric forms having different boiling points. The cis isomer is the lower boiling isomer and is the starting material for the process of the present invention, having a boiling point in the range 87–90° C. at 15 mm. of mercury pressure. It may be prepared according to copending application Serial No. 732,796. The higher boiling isomer has a boiling point in the range 100–105° C. at 15 mm. of mercury pressure. The two isomers can be separated from one another by fractional distillation and are easily distinguished by spectroscopic analysis.

The ratio of the lower boiling isomer of 3-chloro-4-hydroxy-tetrahydrofuran to metal oxide can be varied considerably as excess of the tetrahydrofuran or of the metal oxide does not prevent the reaction occurring. Most suitably, excess of the metal oxide is employed to ensure that the reaction continues to completion.

The reaction occurs readily at elevated temperatures and is preferably carried out at a temperature in the range 100° C. to 200° C.

The process can be carried out directly by heating a suspension of the metal oxide in the liquid lower boiling isomer of 3-chloro-4-hydroxy-tetrahydrofuran. It is often convenient to add an inert liquid diluent to the reaction mixture. Such a diluent should preferably have a boiling point sufficiently different from the boiling point of the produced 3-ketotetrahydrofuran to allow the latter to be distilled in a pure state from the reaction mixture. Suitable inert, liquid diluents are high boiling liquid hydrocarbons such as alkyl substituted benzenes, high boiling petroleum fractions and saturated cyclic hydrocarbons. Specific examples are the di- and tri-isopropyl benzenes, di-secondary butyl benzenes and dekalin.

A preferred method for carrying out the process of the present invention consists in dispersing the metal oxide in a heated, inert, liquid diluent and adding the lower boiling isomer of 3-chloro-4-hydroxy-tetrahydrofuran, preferably slowly, to this reaction medium.

The process of the present invention proceeds readily to give good yields of the desired 3-ketotetrahydrofuran. The ease of the reaction is particularly surprising in view of the fact that the higher boiling isomer of 3-chloro-4-hydroxytetrahydrofuran gives rise exclusively to tetrahydrofuran-3:4-epoxide when treated according to the process of the present invention.

The following examples illustrate the production of 3-keto-tetrahydrofuran according to the present invention. The parts by weight (P.B.W.) and parts by volume (P.B.V.) have the same relationship to each other as do grams to millilitres.

Example 1

The lower boiling isomer of 3-chloro-4-hydroxy-tetrahydrofuran (10.0 P.B.W.) and silver oxide (12 P.B.W.) were heated together under a condenser. A sudden exothermic reaction occurred, and some vapour escaped through the condenser; a silver mirror formed on the sides of the reaction vessel. Heating was continued at about 140° C. for three quarters of an hour, the mixture cooled, diluted into ether, filtered and the solid well washed with ether. The ethereal solution was dried, evaporated and distilled to give 3-ketotetrahydrofuran (ca. 2.5 P.B.W.) and unreacted 3-chloro-4-hydroxytetrahydrofuran (ca. 2.0 P.B.W.).

The 3-ketotetrahydrofuran boiled at 135–139° C. at atmospheric pressure.

Example 2

Example 1 was repeated with di-isopropylbenzene (10 P.B.W.) present in the reaction mixture during the reaction. 2.5 P.B.W. of the desired product was obtained.

Example 3

The lower boiling isomer of 3-chloro-4-hydroxy-tetrahydrofuran (12 P.B.W.), di-isopropylbenzene (10 P.B.W.), and silver oxide (15 P.B.W.) were mixed and heated under a packed column. Again the reaction was vigorous and some vapour escaped through the column. When the reaction had subsided the products were distilled to give a wet ketone fraction (7.1 P.B.W.), followed by some unreacted starting material and the di-isopropylbenzene. The wet ketone fraction consisted of about one quarter water and three quarters 3-ketotetrahydrofuran.

Example 4

Silver oxide (15 P.B.W.) and di-isopropylbenzene (10 P.B.W.) were heated to 150° and the lower boiling isomer of 3-chloro-4-hydroxytetrahydrofuran (10 P.B.W.) added gradually; the bath temperature was finally raised to 200° C. Further additions of silver oxide were made during the distillation, and finally wet 3-ketotetrahydrofuran (5.7 P.B.W.) was obtained.

Example 5

Cuprous oxide (15 P.B.W.) and di-isopropylbenzene (10 P.B.W.) were heated to 150° C. and 3-chloro-4-hydroxy-tetrahydrofuran (18 P.B.W.) added gradually. The bath temperature was eventually raised to 220° C. and the slightly impure 3 - ketotetrahydrofuran (12.3 P.B.W.; 65% pure by analysis) distilled off.

Example 6

Di-isopropylbenzene (30 P.B.W.) and a mixture (60 P.B.W.) of a silver oxide and cuprous oxide were heated under a packed column, and the lower boiling isomer of 3-chloro-4-hydroxytetrahydrofuran (40 P.B.W.) added gradually with the product taken off overhead as formed. Further cuprous oxide was added to the reaction vessel until the reaction was complete. Redistillation of the crude distillate gave the desired 3-ketotetrahydrofuran (16.8 P.B.W.).

Example 7

Mercuric oxide (13.5 P.B.W.) and di-isopropylbenzene (10 P.B.W.) were heated to 150° C. and the lower boiling isomer of 3-chloro-4-hydroxy-tetrahydrofuran (12 P.B.W.) added gradually; the reaction vessel temperature was finally raised to 220° C. The crude, wet product was dried and redistilled to give 3-ketotetrahydrofuran (3.0 P.B.W.).

Repetition of any of the above examples replacing the low-boiling isomer of 3-chloro-4-hydroxytetrahydrofuran with the high-boiling isomer gives rise to tetra-hydrofuran-3:4-epoxide.

I claim:

1. A process for the production of 3-ketotetrahydrofuran which comprises heating the cis isomer of 3-chloro-4-hydroxy-tetrahydrofuran in the presence of a metal oxide selected from the group consisting of silver oxide, cuprous oxide, mercuric oxide and a mixture of silver oxide and cuprous oxide.

2. A process as claimed in claim 1, wherein the reaction is carried out at a temperature in the range 100° C. to 200° C.

3. A process as claimed in claim 1, wherein the metal oxide is dispersed in a heated, inert, liquid diluent and the cis isomer of 3-chloro-4-hydroxy-tetrahydrofuran is added to the dispersion.

4. A process for the production of 3-ketotetrahydrofuran which comprises heating the cis isomer of 3-chloro-4-hydroxy-tetrahydrofuran in the presence of silver oxide.

5. A process for the production of 3-ketotetrahydrofuran which comprises heating the cis isomer of 3-chloro-4-hydroxy-tetrahydrofuran in the presence of cuprous oxide.

6. A process for the production of 3-ketotetrahydrofuran which comprises heating the cis isomer of 3-chloro-4-hydroxy-tetrahydrofuran in the presence of mercuric oxide.

7. A process for the production of 3-ketotetrahydrofuran which comprises heating the cis isomer of 3-chloro-4-hydroxy-tetrahydrofuran in the presence of a mixture of silver oxide and cuprous oxide.

No references cited.